Patented Aug. 19, 1924.

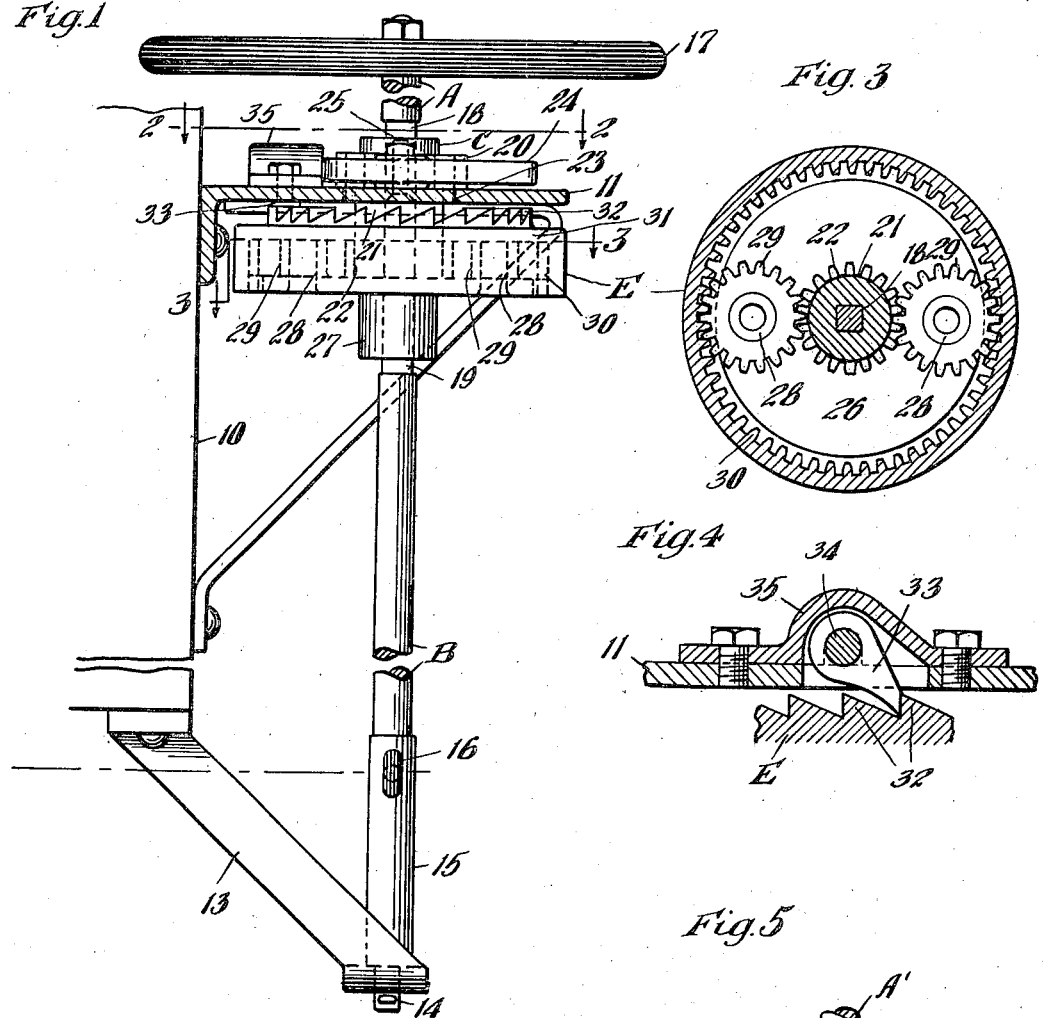

1,505,350

UNITED STATES PATENT OFFICE.

GEORGE A. JOHNSON AND JOHN F. O'CONNOR, OF CHICAGO, ILLINOIS, ASSIGNORS, BY MESNE ASSIGNMENTS, TO W. H. MINER, INC., A CORPORATION OF DELAWARE.

HAND BRAKE.

Application filed January 25, 1923. Serial No. 614,744.

*To all whom it may concern:*

Be it known that we, GEORGE A. JOHNSON and JOHN F. O'CONNOR, citizens of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

One object of the invention is to provide a simple and efficient hand brake, wherein means is provided for rapidly taking up the slack in the brake chain and subsequently automatically increasing the ratio of leverage to exert greater force in the final application of the brakes.

Another and more specific object of the invention is to so provide, in a hand brake of the vertical staff type, automatically operative means, including a planetary gearing, for multiplying the effective ratio of leverage of the chain winding means as the resistance offered during the final application of the brakes increases.

In the drawing forming a part of this specification, Fig. 1 is a side elevation of a portion of the end of a freight car, showing our improved hand brake in connection therewith, the platform or step being shown in section. Fig. 2 is a horizontal sectional view taken substantially on the line 2—2 of Fig. 1. Fig. 3 is a horizontal sectional view taken substantially on the line 3—3 of Fig. 1. Fig. 4 is a detailed sectional view taken on the line 4—4 of Fig. 2, showing the gravity locking pawl. And Fig. 5 is a vertical sectional view of the planetary gearing and ratchet mechanism of a modified form of the invention.

In said drawing, 10 denotes the end wall of a freight car, said wall being provided with the usual platform or step 11 on which the brakeman stands while applying the brakes in the usual manner. The platform 11 is supported by bracket 12 suitably secured to the end wall of the car. At the bottom of the car is the usual stirrup 13, forming a lower bearing for the vertical brake staff.

In the construction shown, the vertical brake staff is formed with an upper section A and a lower section B. The lower section is journaled at its lower end as indicated at 14 in the stirrup 13 and has an enlarged portion 15 on which the brake chain is wound, the chain being anchored to the staff by means of an eye bolt 16 or by any other suitable means. The upper section A of the staff is provided at its top end with a hand wheel 17 of usual form.

As clearly shown in Figs. 1, 2 and 3, the lower end of the section A of the staff is squared as indicated at 18 and the upper end of the lower section B of the staff is similarly squared as indicated at 19. The said adjacent squared ends of the two sections of the staff are located slightly below the platform 11, as clearly shown in Fig. 1. On the square section 18 of the upper section A of the staff, is mounted for rotation therewith a casting C having an upper ratchet wheel 20 and intermediate bearing portion 21 and a lower spur gear 22. The casting C extends through the corresponding perforation 23 in the platform 11, thus forming a suitable bearing for the lower end of the staff section A. The ratchet wheel 20 cooperates with a foot operated pawl or dog 24 pivotally mounted on a suitable bolt 25 extending through the platform.

On the squared portion 19 of the staff section B is mounted for rotation therewith, the casting D comprising a disc 26 provided with an integral hub 27. The disc 26 is provided with two upwardly projecting hollow stub shafts 28 integral therewith. Meshing with the gear 22 and rotatably mounted on each stub shaft 28 is a gear 29.

A ring gear E having internal gear teeth 30 surrounds and meshes with the gears 29. At its upper side the ring gear E is provided with an inwardly projecting flange 31 provided with upwardly extending ratchet teeth 32. The flange 31 extends over the gear 29 and rests thereon and on the stub shafts 28, thereby supporting the gear E. In this connection it is pointed out that the gears 22, 29 and E together form, in effect, a planetary gearing.

A gravity locking pawl 33 pivoted on a pin 34 secured in the side walls of a housing 35 mounted on the platform 11, engages with the teeth 32 on the ring gear E to prevent rotation thereof in a contra clock-wise direction.

In the operation of our improved hand brake as shown in Figs. 1 to 4 inclusive, upon rotation of the hand wheel 17 in a clock wise direction in applying the brakes, the spur gear 22 will be rotated therewith, and due to the frictional resistance between the teeth of the gears 22 and 29 and the ring gear E, the gears 29 together with the casting D and the ring gear E will be rotated bodily around the axis of the gear 22 in unison therewith, thereby imparting rotation to the lower section B of the brake staff in unison with the upper section A and causing the chain to be wound thereon. In this connection it is pointed out that free rotation of the ring gear E and the ratchet wheel 20 in a clock-wise or chain winding direction is permitted by the pawls 33 and 24 respectively. During this initial winding operation, the slack in the brake chain will be taken up and the brake shoes brought rapidly into engagement with the car wheels.

During the further rotation of the hand wheel 17, in the final application of the brakes, the resistance offered will be sufficient to overcome the frictional resistance between the parts of the planetary gearing, comprising the gears 22, 29 and E, causing the gears 29 to rotate on the stub shafts 28 and travel on the internal teeth of the ring gear E. During this operation the gear E remains stationary, movement thereof in a contra clock-wise direction being prevented by the locking pawl 33. The gears 29 together with the casting D and the staff section B will thus be rotated about the axis of the gear 22 at a lower rate of speed than the gear 22 and the staff section A, thereby multiplying the leverage ratio during the final application of the brakes.

To release the brakes, the locking pawl 24 is disengaged from the ratchet wheel 20 thereby allowing the staff section A, gear 22 and the casting D together with the staff section B to move in a contra clock-wise direction while the gears 29 travel over the internal teeth of the ring gear E.

In the modification shown in Fig. 5, the upper section of the brake staff is indicated by A', and the lower section by B'. At the lower end of the squared portion 118 of the section A' is fixed a spur gear 122. Above the latter, slidably mounted, on said squared portion 118 for rotation with the staff A', is a ratchet wheel 120. A locking pawl 124 pivoted on the bolt 125 prevents contra-clockwise rotation of said ratchet wheel. The gear 122 meshes with gears 129 rotatably mounted on hollow stub shafts 128 projecting upwardly from the casting D', in all respects similar to the casting D of the preferred form and rigidly secured to the lower stub shaft B' for rotation therewith. The gears 129 mesh with the internal teeth 130 on the ring gear E'. The ring gear E' is provided with an upwardly projecting hollow boss 140 extending thru an opening 141 in the platform 111. At its upper end, the boss 140 is provided with clutch teeth 142 co-acting with similar clutch teeth 143 on the lower face of the ratchet wheel 120. The boss 140 is also provided with peripheral ratchet teeth adapted to co-operate with a locking pawl 144 pivotally mounted on the bolt 125 below the pawl 144; the locking pawl 144 preventing rotation of the gear E' in a contra-clock-wise direction.

In the operation of the modified form of the invention shown in Fig. 5, upon rotation of the staff A' in a clock-wise direction, in applying the brakes, the ratchet wheel 120 and the spur gear 122 will be rotated in a clock-wise direction, and the face clutch teeth 142 and 143 of the ring gear E' and the ratchet wheel 120 respectively will cause bodily rotation of the gear E' together with the gears 129 around the axis of the gear 122 in unison with the staff section A', thereby imparting the rotation to the lower section B' of the brake staff in unison with said upper section and effecting the winding of the brake chain on the section B'. During the first part of the operation of winding the brake chain on the staff, the slack will be taken up and the brake shoes brought rapidly into engagement with the car wheels.

The inclination of the inter-engaging teeth 142 and 143 of the clutch elements is such as to offer sufficient resistance to prevent disengagement of the clutch elements during the operation of taking up the slack in the brake chain, but the inclination of said teeth is not sufficient to prevent the teeth from slipping over each other upon a greater or predetermined resistance being offered to the turning movement, such as results when the brake shoes are forced firmly into engagement with the car wheels.

During the further rotation of the staff section A' in the final application of the braking pressure, the resistance offered will therefore be sufficient to cause the teeth 143 on the ratchet wheel 120 to ride upward on the teeth 142 of the gear E', thus rendering the clutch ineffective, with the result that the staff section A' will rotate relatively to the staff section B' and the gears E' and 129 carried thereby. The resistance offered during the final application of the brakes will also be sufficient to overcome the frictional resistance between the parts of the planetary gearing comprising the gears 122, 129 and E', causing the gears 129 to rotate on the stub shafts 128 and travel on the internal teeth of the gear E'. During the travel of the gears 129 over the teeth of the internal gear E', movement of the latter in a contra-clock-wise direction will be prevented by the pawl 144.

The gears 129 together with the casting

D' and the staff section B' will be rotated about the axis of the gear 122 at a lower rate of speed than the gear 122 and the staff section A', thereby multiplying the leverage ratio during the final application of the brakes.

To release the brakes the locking pawls 124 and 144 are both released from engagement with the ratchet wheel 120 and the ratchet portion of the boss of the gear E', thus allowing free rotation of all parts together with the staff sections A' and B' in a contra clock-wise or chain unwinding direction.

From the preceding description taken in connection with the drawing, it is evident that in both forms of the invention illustrated herein, the leverage ratio is greatly multiplied during the final application of the braking pressure, and that the change from low leverage ratio to the high ratio is effected entirely automatically. It will also be evident that by making the proper selection of gears, any desired leverage ratio may be obtained.

We have herein shown and described what we now consider the preferred manner of carrying out our invention, but the same is merely illustrative and we contemplate all changes and modifications that come within the scope of the claims appended hereto.

We claim:

1. In a hand brake, the combination with upper and lower brake staff sections; of a ratchet element and gear rotatable in unison with said upper staff section; means for rotating said upper staff section; a carrier member rotatable in unison with said lower staff section; horizontally arranged gears rotatably mounted on said carrier and meshing with said first named gear; a ring gear supported by and meshing with said carrier gears; and means positively engaging said ring gear for preventing rotation of said ring gear in a counter clockwise direction but permitting clockwise rotation thereof, all of said gears being bodily rotatable in unison for effecting take-up of the brake chain until a predetermined resistance is encountered, whereupon the friction between said gears is overcome and said gears are rotated relatively to each other while said ring gear is held stationary, thereby multiplying the leverage ratio of said upper brake staff section.

2. In a hand brake, the combination with upper and lower brake staff sections; of a ratchet element and gear rotatable in unison with said upper staff section; means for rotating said upper staff section; a carrier member rotatable in unison with said lower staff section; gears rotatably mounted on said carrier and meshing with said first named gear; a ring gear supported by and meshing with said carrier gears, and means constantly operable for preventing rotation of said ring gear only in a contra clockwise direction, all of said gears being bodily rotatable in unison for effecting taking up of the brake chain until a predetermined resistance is encountered, whereupon the friction between said gears is overcome and said gears are rotated relatively to each other while said ring gear is held stationary, thereby multiplying the leverage ratio of said upper brake staff section.

3. In a hand brake, the combination with upper and lower brake staff sections; of a ratchet element and gear rotatable in unison with said upper brake staff gear section; means for rotating said upper section; a carrier member rotatable in unison with said lower staff section; gears rotatably mounted on said carrier and meshing with said first named gear; a gear meshing with said carrier gears; and gravity actuated means for locking all of said gears to rotate in unison, said locking means becoming automatically inoperative upon a predetermined resistance being encountered in tightening of brakes, thereby locking said last mentioned gear against movement and permitting the other gears to rotate relatively to each other, whereby the leverage ratio of said upper brake staff section is multiplied during the final application of the brakes.

In witness that we claim the foregoing we have hereunto subscribed our names this 20th day of January, 1923.

GEORGE A. JOHNSON.
JOHN F. O'CONNOR.

Witnesses:
FRANCES SAVAGE,
HARRIETTE M. DEAMER.